E. C. ALBREE.
ACCOUNTING SYSTEM.
APPLICATION FILED NOV. 16, 1904.

901,579.

Patented Oct. 20, 1908.

Witnesses
Chas. B. Crocker.
Walter H. Weston.

Inventor:
Edward C. Albree,
By his Attorney,
T. Hart Anderson

E. C. ALBREE.
ACCOUNTING SYSTEM.
APPLICATION FILED NOV. 16, 1904.

901,579. Patented Oct. 20, 1908.

Witnesses
Chas. B. Crocker.
Walter H. Weston

Inventor
Edward C. Albree,
By his Attorney,
A. Hart Anderson

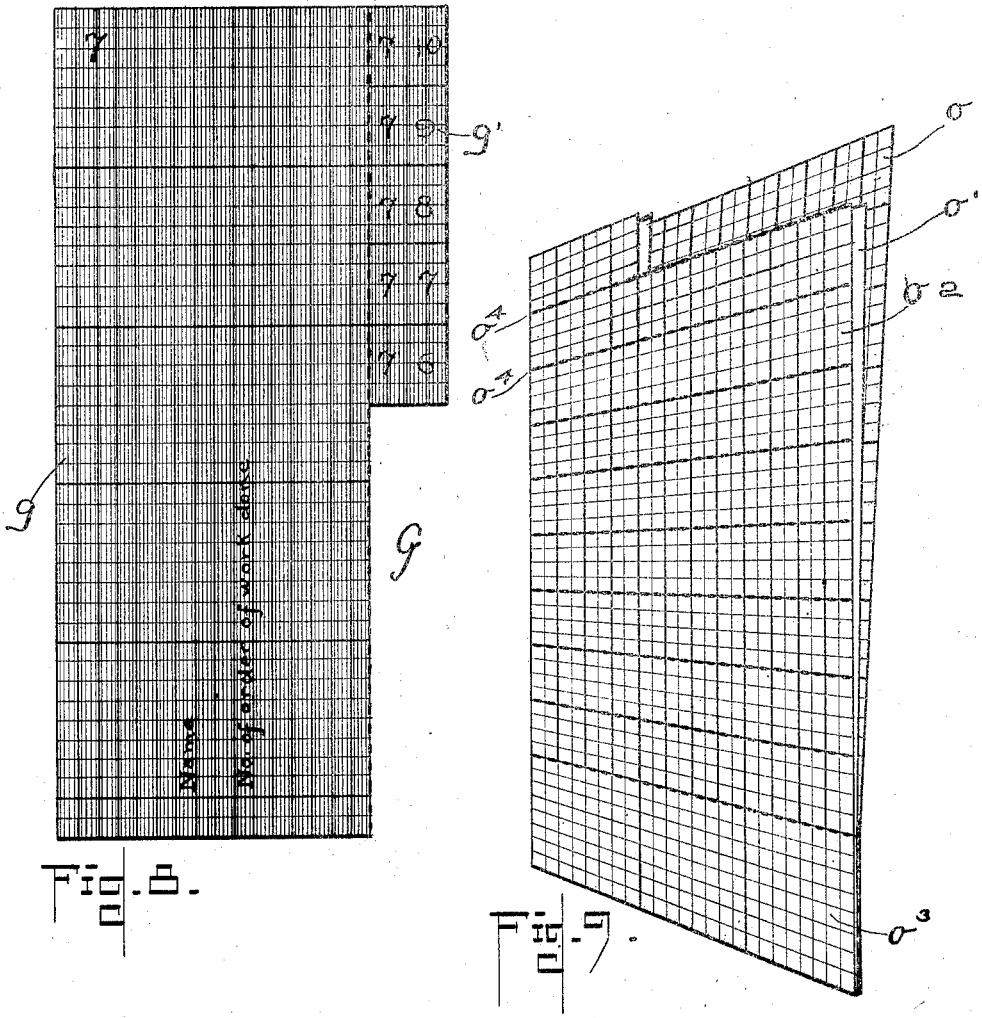

UNITED STATES PATENT OFFICE.

EDWARD C. ALBREE, OF SWAMPSCOTT, MASSACHUSETTS.

ACCOUNTING SYSTEM.

No. 901,579.

Specification of Letters Patent.

Patented Oct. 20, 1908.

Application filed November 16, 1904. Serial No. 232,930.

*To all whom it may concern:*

Be it known that I, EDWARD C. ALBREE, a citizen of the United States, residing at Swampscott, in the county of Essex and State of Massachusetts, have invented certain new and useful Improvements in Accounting Systems; and I do hereby declare the following to be a full, clear, and exact description of the invention, such as will enable others skilled in the art to which it appertains to make and use the same.

The present invention relates to a system of recording and record cards for determining, recording and preserving in shops and factories the cost of labor and materials in connection with any particular job of work which may be done in said shop or factory.

Prior to the present invention, in determining the cost of a particular job it was the practice to make out a tag for the order and upon this tag as the work progressed through the various departments of the factory the workmen recorded their time and each of them put down his name or number on this tag, together with the amount of time which 1 had expended on the job. This tag upon the completion of the job is sent to the office where it is necessary to ascertain at what rate any particular workman who had worked on the job was paid, and after ascertaining this fact from the books of the office, the number of hours that any particular workman had worked on the job was multiplied by his rate of pay per hour, and the total value of his time ascertained, and this had to be done in the case of each workman who had worked on the job. This required a great amount of labor on the part of the employees of the accounting division of the factory, as will be readily perceived, for there may have been several workmen engaged on a particular job for a varying amount of hours each, each of whom may have received a different amount of pay per hour and in order to ascertain the total cost of the labor on that job, there was necessitated a great amount of adding and multiplying. Furthermore by this method there was absolutely no check on the workmen, and the time of any particular workman may have been charged to some particular job when in fact during this time, he was employed on some other job. Furthermore, the amount of material used on the job was charged on this tag and had to be added in and counted, in determining the cost of the particular job, and as in the case of workmen, there was no check on the material charges, it often happened that material received for a particular job was used in an entirely different job.

The object of the present invention is to provide means whereby this vast amount of labor on the accounting force of the factory is done away with, and whereby by suitable record and recording blanks or cards the total of labor in the various departments of a factory, and also the total of material utilized in the production of any particular job may be determined almost at a glance and in such a manner that an absolute check is placed upon the workmen as regards where and when their time was expended and upon what particular job certain materials were used, and to so construct these record and recording blanks or cards as that when the job is completed and the records are placed for preservation in the archives of the office, the total cost of labor and materials on the job in question may be ascertained almost at a glance.

To the above ends the present invention consists of a record card provided upon its face with lines or other suitable marks of demarcation indicating a certain unit of value, with the totals of adjacent units indicated by figures thereon, combined with recording blanks or cards provided with detachable adhesive coupons also ruled or marked with units of value corresponding to the units of value indicated on the record cards, and arranged to be attached to said record cards and to cover one or more of the spaces on said record cards, indicating units of value, thus indicating the total value based upon any given unit of value of the labor or material as the case may be.

The present invention further consists of the details of construction which will be hereinafter described and claimed.

The invention is illustrated in the accompanying drawings, in which:—

Figure 1 shows grouped together a series of record cards both of labor and material, having the total cost of labor and material recorded thereon as said cards will be arranged for filing and preservation. Fig. 2 shows a record blank for one department of a factory, for instance department A. Fig. 3 shows a record blank for another department of a factory, for instance department B. Fig. 4 shows a record blank for another department of a factory, for instance department C. Fig. 5 shows a record blank for another department of a factory, for instance the material department. Fig. 6 shows a recording blank for a workman receiving a certain amount per hour. Fig. 7 shows a recording blank for a workman receiving one-third more per hour than the workman who will be given the recording blank shown in Fig. 6. Fig. 8 shows a recording blank for a workman who will receive twice as much as the workman who will be given the recording blank shown in Fig. 6 and a third more than the workman who will be given the recording blank shown in Fig. 7. Fig. 9 shows combined a material record blank and recording blanks which will be hereinafter fully described.

Similar reference characters will be employed throughout the specification and drawings to designate corresponding parts.

I have shown in Figs. 2, 3 and 4 of the drawings three labor cards, A, B and C, which, except for the fact that card B is cut out as shown at $b$, and card C is cut out as shown at $c$, are exactly alike, and it will be understood that one of these cards will be employed in recording the total of labor expended on a particular job in any particular department of the factory, and that while three of such cards are shown, the number thereof will be determined by the number of departments in any particular factory.

In the illustrated embodiment it will be assumed that record card A is for use in the carpentry department of the factory, that record card B is used in the painting department of the factory and that record card C is used in the upholstering department of the factory, and upon each of these cards will be recorded the number of hours which particular workmen and particular grades of workmen have been employed on a particular job in that particular department.

The record cards A, B and C are divided by a double line or some other suitable line of demarcation, $a$, $b^1$ and $c^1$ into two fields or spaces $a^1$, $a^2$, $b^2$, $b^3$, $c^2$, $c^3$, the smaller spaces $a^2$, $b^3$ and $c^3$ being at the right as the cards are viewed with the sheets of the drawing held upright with one of the shorter sides of the sheet considered as the top of said sheet and the fields or spaces $a^1$, $b^2$ and $c^2$ being at the left, all as clearly shown in the drawing.

The smaller fields or spaces while they may be ruled with lines crossing each other in the same manner as the large spaces, are not intended to indicate totals of value of labor, or materials, as the case may be, and so far as the present invention is concerned, these lines crossing each other while they are shown in the drawings, may be omitted, but in these spaces are intended to be recorded such memoranda as may be desired; for instance, as shown in Fig. 2, there is recorded a memorandum M to the effect that on order No. 8, calling for the production of four hundred of a certain article known as XXXX, there has been expended a certain amount of labor, at a certain cost in a certain department, in this particular instance in department A, labor at a total value of 90 cents, and a similar record may be made in the smaller fields or blanks of the record cards B and C. There will also preferably be left across the bottom of each card, a blank space which in this particular instance is shown as covering a depth of three lines of spaces, but which may be left entirely blank if desired, in which is placed a hole $h$, whereby the records may be filed away by the filing rod of an ordinary card index receptacle, or if the system is embodied in what is known as a loose leaf system, may be otherwise secured in a holder or binder.

The fields or spaces $a^1$, $b^2$, $c^2$, are ruled with lines 1 and 2, crossing each other at right angles and at equal distances apart, forming small squares which preferably by the more pronounced lines 3, will be divided into columns extending inward from the left of the card to the lines of demarcation $a$, $b^1$ and $c^1$, each column being as shown in the drawing, four spaces wide. Each group of four squares in each column as said column extends inward from the left towards the line of demarcation, $a$, $b^1$, $c^1$ in the system as illustrated in the drawings, represents a unit of value of 5 cents, as this is a convenient unit to use in determining cost, but of course this unit of value may be changed as desired to meet any particular circumstance, and as will be seen there are on each of the cards A, B and C six of such columns of a width corresponding to four spaces each, the columns being lettered in each instance $v$ and there will be shown on each column beginning from the lowermost column on each card A, B and C and extending inward from the left hand edge of said card, figures indicating the totals which of course may be placed in each group of four spaces, in which event they would progress in multiples of five, or as illustrated in the drawing in two adjacent groups of four spaces, in which event the total will be indicated in multiples of 10; that is to say, beginning with the lowermost column, figure 10 will be placed in the third group of four spaces, and the figure 20 in the fifth group of four spaces, and so on every other group of four spaces in multiples of 10 until the top of the column is reached adjacent the line of demarcation $a$, $b^1$, $c^1$, above which will appear the total 130 indicating that the total value of the column of four space groups in said first column is $1.30.

The next column will run as shown from 140 to 260, and so on through the series of columns until the total 780 is reached, and this may be extended or reduced as convenience or necessity may require, the illustrated form being sufficient to demonstrate the operation of my invention.

At the front of the group of cards shown in Fig. 1 is a card which in all respects is substantially like the cards A, B and C, and which accordingly will be lettered D, and like the other cards it has a line of demarcation $d$, dividing it into a field $d^1$ and a field $d^2$, and also with the blank filing edge $d^3$, and like the other cards this card has a similar group of parallel columns extending inward from the left with the totals in each column substantially like the totals in the columns in the cards A, B and C. This card D, however, is a material card, and upon it is designed to be recorded the amount of material which has been utilized in a particular job, and the number of the job, etc., may be entered in the field $d^1$, as in the case of cards A, B and C.

Coöperating with the labor record cards A, B and C are the recording cards E, F and G, which cards are given to the workmen and which for this reason will be hereinafter called time cards. Each of the time cards comprises a body portion $e$, $f$, $g$, upon which may be placed any suitable data, for instance, the number of the workman and his name and the number of the order upon which he is working. Thus it will be seen that time card E was given to workman No. 25, as the number 25 is placed thereon. Time card F was given to workman No. 18, which is correspondingly numbered and time card G to workman No. 7. Each of the time cards along one edge is provided with a series of detachable recording coupons $e^1$, $f^1$, $g^1$, which coupons upon their under face are provided with a suitable adhesive.

If the system is used where a ten hour day is in force, there will be upon the respective time cards ten coupons, each of which will preferably bear the number of the workman as clearly shown, and the coupons will be numbered from 1 to 10, respectively, all as clearly shown in the drawings, and each of the coupons is marked off into spaces corresponding in size to the spaces in the columns of squares on the record cards A, B and C, and if desired the body of the card may be similarly ruled, although this is not essential. Also as indicated by the shading in the drawing these time cards and coupons may be of a different color from the record cards. The coupons on all of the time cards are preferably of the same width, that is to say, four squares wide corresponding in width to the width of the columns on the record cards, although this is not essential, but they vary in height according to the sum paid to the workmen. That is to say, time card E is in the illustrated embodiment given to a workman who gets 10 cents per hour, so that his time card will be twenty spaces long, and will have attached thereto ten coupons, each of which will be two spaces high, the unit of value being five cents, each coupon will therefore represent a total of 10 cents.

Time card F is thirty squares long and is provided with ten coupons, each of which will be three squares high, thus indicating that this workman is receiving 15 cents per hour, and that the value of each of his coupons is 15 cents.

Time card G is forty spaces long, and is provided with ten coupons, each of which is four spaces high, that is to say, each coupon will preferably be a perfect square, thus indicating that this workman receives 20 cents per hour, and that each of his coupons is of a value of 20 cents.

Each of the workmen in the factory will be given a time card bearing coupons of a height corresponding to the sum at which he is paid per day, and as he finishes the work on a particular job, he removes as many of the coupons from his time card as will represent hours or half hours, if such be the case, that he has worked on this job, and this is handed to the person in charge of the record cards A, B, or C, in the department where the work is done, and they are attached to said record cards as shown clearly in Figs. 2, 3 and 4, the first coupons being attached in the lowermost column and beginning at the left hand edge, as clearly shown, and other coupons being attached in line with and continuing the line of recording coupons until the first column is completely covered up to the lines $a$, $b^1$, $c^1$, as the case may be, whereupon the next adjacent column will be covered with the recording coupons. Thus it will be seen that as the coupons are detached from the time cards, they indicate, by the very act of attaching them to the record cards A, B and C, the total amount of labor which has been done by the workmen in the department.

Examining the drawings, it will be seen that workman No. 25 receiving 10 cents per hour, has worked eight hours and has detached from his time card eight coupons, and in Fig. 2, we find that coupons Nos. 1, 2 and 3 of this workman No. 25 have been attached to card A, indicating that this workman has worked three hours on a certain order in department A, and if coupons 1, 2 and 3 of No. 7 were removed from card A, it would be found that in the space above the three coupons of workman No. 25 there would appear the number 30, which would indicate the value of this workman's time, that is to say, 30 cents.

In Fig. 3 will be found coupons Nos. 4, 5, 6 and 7 of workman No. 25, in the first column of the record card B, and in Fig. 4 will be found coupon No. 8 of workman No.

25, on the record card C. Thus it will be seen that the eight coupons which have been detached from the time card of workman No. 25 will be accounted for, and found upon the record cards.

From the time card of workman No. 18, who gets 15 cents per hour, there have been removed four coupons, indicating that he has worked four hours on some work in the factory, and an inspection of Fig. 3 will show that on record card B has been placed coupons Nos. 1 and 2 of workman No. 18, which added to coupons Nos. 4, 5, 6 and 7 of workman No. 25 brings the total of labor in department B as indicated by record card B, to 70 cents. The other coupons of workman No. 18 are shown as attached to record card C, in Fig. 4, and if coupons Nos. 4 and 5 of workman No. 7 were removed from said card just above the edge of coupons No. 4 of workman No. 18 would appear the numeral 40, which would indicate that the total of labor to that point was 40 cents. From time card No. 7 in Fig. 8 there have been removed five coupons and upon record card A, shown in Fig. 2, there will be found attached coupons Nos. 1, 2 and 3 of workman No. 7, which being of a value of 20 cents each and added to the three coupons of workman No. 25, which have a value of 10 cents each, has brought the total of labor in department A up to 90 cents. The remaining coupons Nos. 4 and 5 of workman No. 7 are shown as attached to record card C, in Fig. 4, and as they are of a value of 20 cents each, when added to one coupon of workman No. 25 and the two coupons of workman No. 18, brings the total up to 80 cents, as will be clearly seen from the drawings.

It will thus be seen that by this system there is an absolute check on the workman for having once removed his coupons and attached them to some record card, there can be no mistake but what he has expended the time, nor can there be any mistake as to what particular job he has worked on. After the job is finished, and the coupons properly attached to the record cards A, B and C, which are the records for the labor expended in various departments of the factory on a particular job, it may be seen at a glance the labor in department A amounts to 90 cents and this total is placed in the field $a^2$ at the upper right hand corner thereof, as shown.

The labor in department B is 70 cents, and this is also placed in the upper right hand corner as shown. The labor in department C is 80 cents and this is also placed in the upper right hand corner, as shown, so that when the cards A, B and C are brought together in the position shown in Fig. 1, the totals appear in line for adding and there will be preferably placed upon the record card D a note or memorandum as to the total labor, record card D being cut out in the same manner as cards B and C are cut out, but a little lower than card C, and the total amount of labor may be figured on this card D, which will be, as shown in Fig. 1, $2.40.

The system of keeping track of the amount of materials used is substantially the same as that for keeping track of the amount of labor used, and consists, first, of what might be termed an invoice record card, P, shown in Fig. 5, which by the lines $p$ is divided into an upper field $p^1$ and a lower field $p^2$. The lower field is divided into four vertical columns, each of which will be four squares wide and substantially like the columns on the record cards A, B, C and D, and of the same size and like the columns of cards A, B, C and D are based on a unit of value of five cents for each space or group of four squares; thus the total of the amount of columns in the first column of the invoice record card B below the line of demarcation $p$ will be $2.00, indicated by the numeral 200 at the top of said column, and so on through the adjacent columns of squares until the final total of 800 or $8.00 is indicated in the last column; that is to say, the left hand column.

In the field $p^1$ is placed any suitable record, such as "Received", indicating when the material was received in the stock room of the factory, and the number of the invoice and other data, and also what the material is, is indicated by the character XXX, and how much of such material has been received and its cost price, and the number of packages and the price per package, etc., and the total cost. This is all filled out in the office and is sent to the stock room and in the illustrated embodiment, it indicates that of certain articles known as XXX, there has been received 120 pounds, that it is divided into 12 packages of 10 pounds each, and that the cost is 40 cents per package, making a total cost of that amount of material in the stock room of $4.80. Now it is to be assumed that in the manufacture of a certain order, 80 cents' worth of these particular articles, designated as XXX, has been required and to secure this material from the stock room there is provided a material order book, which must be filled out by the foreman of a department to secure this material from the stock room. This order book is shown in Fig. 9, and as shown comprises a permanent record blank $o$, a stock room blank $o^1$ and a department recording blank $o^2$, the blanks being secured together at one end $o^3$ in any suitable way. The blanks $o$ and $o^2$ are ruled having spaces equal in size to the spaces on the stock room record $p^1$ of the material record D, and the blank $o^2$ may if desired be divided by lines of perforations of whereby strips or coupons of an indefinite length, but each four squares wide, may be filled out and removed. Now when the foreman of a department desires to secure from the stock room certain material he writes upon the desired number of coupons of the blank $o^2$ the amount of such material and this record is transferred by a double carbon sheet (not shown), which will be inserted between the blanks $o$ and $o^1$, to the blank $o^1$ and the blank $o$. He then detaches from the blank $o^2$ and the blank $o^1$ a strip of coupons which in multiples of fives will indicate the cost of such material. Thus it will be seen from Fig. 9 there has been removed a strip corresponding to 16 spaces in length and 4 squares in width. The strip removed from record $o^2$ is retained by the foreman in charge of the job, and is attached to the material record card D, as shown clearly in Fig. 1, thus indicating that 80 cents' worth of material has been utilized in this job.

The strip detached from the record $o^1$ is taken to the stock room and handed in in payment of the material, the person in charge of the stock room attaching this strip to the invoice card P, indicating that 80 cents' worth of this material has been handed out. The under surface of the blank $o^2$ and the blank $o^1$ will be provided with a suitable adhesive.

The record blank $o$ is retained by the foreman to show what material he has ordered.

Thus it will be seen that by this system the value of the total cost of labor and materials in any particular job is readily ascertained, and that furthermore a complete check is provided to determine what has become of the material and that when the material card D and the department cards A, B and C are graded as shown in Fig. 1, and the totals properly carried out in the spaces at the left of said cards, there is a complete record ready for filing to the effect that an order has been filled, that certain articles have been made, that in the making of these articles a certain amount of labor has been expended and a certain amount of material used, and the total of both labor and material indicated on the material card D, which in the instance illustrated is $3.30.

It will of course be understood that the illustrated example of my invention is to be regarded as merely sufficient to enable those skilled in the art to understand its construction and mode of operation, and that the only essential feature thereof which I have illustrated and described is a record blank provided with indicated spaces of equal height arranged in columns, each space representing a unit of value, and combined with the record blank certain recording coupons which in height shall correspond to one or more of the unit spaces of the recording blank, and that while I have illustrated parts of my system as being embodied in a so-called card system, it is to be understood that the invention is not limited to a card system, but may be embodied in a loose sheet system. It will be further understood that in the illustrated embodiment I have represented each of the three workmen as being employed on the job in each of the three departments of the factory or shop, but this will hardly be probable in actual practice, and has been only illustrated by me in order to save the making of additional sheets of drawing which would be necessary had I illustrated several groups of time cards for the several groups of workmen in the several departments of the factory. It is thought, however, that the operation of my invention has been sufficiently disclosed and that further description thereof will be unnecessary.

Having described my invention I claim as new and desire to protect by Letters Patent of the United States:

1. In an accounting system and in combination, a sheet having spaces of uniform size arranged in a plurality of columns of equal height, furnished with progressive numerals, beginning at a predetermined starting point and following a predetermined path, the centers of said spaces being equidistant from each other along the said path, and a second sheet provided with coupons divided from each other by weakened lines, each of the coupons on said second sheet being of one size which is a multiple of one of the spaces on the first sheet.

2. In an accounting system and in combination, a sheet having spaces of uniform size arranged in a plurality of columns of equal height, furnished with progressive numerals, beginning at a predetermined starting point and following a predetermined path, the centers of said spaces being equidistant from each other along the said path, and two or more sheets provided with coupons divided from each other by weakened lines, the coupons on one coupon sheet being of different size from those on another coupon sheet, but all the coupons on any sheet being the same size and a multiple of the spaces on the first mentioned sheet.

3. In an accounting system and in combination, a sheet having spaces of uniform size arranged in a plurality of columns of equal height, furnished with progressive numerals, beginning at a predetermined starting point and following a predetermined path, the centers of said spaces being equidistant from each other along the said path, each of said numerals being a multiple of the number of the space to which it is applied, the number of said space being counted from said predetermined starting point along said predetermined path, and a second sheet provided with coupons divided from each other by weakened lines, each of the coupons on said second sheet being of one size which is a multiple of one of the spaces on the first sheet.

4. In an accounting system and in combination, a sheet having spaces of uniform size arranged in a plurality of columns of equal height, furnished with progressive numerals, beginning at a predetermined starting point and following a predetermined path, the centers of said spaces being equidistant from each other along the said path, and a second sheet provided with coupons divided from each other by weakened lines, each of the coupons on said second sheet being of one size which is a multiple of one of the spaces on the first sheet, said coupons being also furnished with progressive numerals.

5. In an accounting system and in combination, a sheet having spaces of uniform size arranged in a plurality of columns of equal height furnished with progressive numerals, beginning at a predetermined starting point and following a predetermined path, the centers of said spaces being equidistant from each other along the said path, and a second sheet provided with adhesive coupons divided from each other by weakened lines, each of the coupons on said second sheet being of one size which is a multiple of one of the spaces on the first sheet, whereby the coupons which are detached from the said coupon sheet may be caused to adhere to the said first sheet, covering some of the spaces thereon and concealing from sight the numerals in the said spaces.

In testimony whereof I affix my signature, in presence of two witnesses.

EDWARD C. ALBREE.

Witnesses:
T. HART ANDERSON,
MAY A. KENNEY.